(12) United States Patent
Stanton

(10) Patent No.: US 7,987,104 B2
(45) Date of Patent: *Jul. 26, 2011

(54) SYSTEMS AND METHODS FOR PROVIDING SUPPLEMENTAL INSURANCE FOR LEASED VEHICLES

(76) Inventor: Owen D. Stanton, Commack, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/589,591

(22) Filed: Oct. 26, 2009

(65) Prior Publication Data

US 2010/0114612 A1 May 6, 2010

Related U.S. Application Data

(63) Continuation-in-part of application No. 10/317,268, filed on Dec. 10, 2002, now Pat. No. 7,610,209.

(51) Int. Cl.
*G06Q 40/00* (2006.01)
*G06Q 10/00* (2006.01)

(52) U.S. Cl. ............................................. 705/4; 705/35

(58) Field of Classification Search ...................... 705/4
See application file for complete search history.

(56) References Cited

U.S. PATENT DOCUMENTS

| | | | |
|---|---|---|---|
| 4,736,294 A | 4/1988 | Gill et al. | |
| 5,852,808 A | 12/1998 | Cherny | |
| 6,018,714 A | 1/2000 | Risen, Jr. et al. | |
| 6,023,687 A | 2/2000 | Weatherly et al. | |
| 6,182,048 B1 | 1/2001 | Osborn et al. | |
| 6,272,471 B1 | 8/2001 | Segal | |
| 6,347,302 B1 | 2/2002 | Joao | |
| 2002/0152115 A1 | 10/2002 | Morita et al. | |
| 2002/0177926 A1* | 11/2002 | Lockwood et al. | 701/1 |

FOREIGN PATENT DOCUMENTS

WO    WO 02/159808    8/2002

OTHER PUBLICATIONS

Davenport, Don't let your insurer make you feel a crash dummy, Sep. 8, 2001, The Daily Telegraph, p. 08.*
Davenport, Stephen, Don't let your insurer make you feel a crash dummy, The Daily Telegraph (London), Sep. 8, 2001, p. 08.
Timoteo, Paul, A Total Loss, Canadian Underwriter, Aug. 2002, p. 70, 69,9; ABI/INFORM Global.
Arizona Republic, Know the Terms for Successful Auto Leasing, Sep. 3, 1998, Edition: Final Chaser, Section: Special Section, p. AL4.
Williams, Jr., Risk Management and Insurance, 1976, pp. 491, 505-506, Third Edition, McGraw-Hill Book Company.

(Continued)

*Primary Examiner* — Luke Gilligan
*Assistant Examiner* — Tran Nguyen
(74) *Attorney, Agent, or Firm* — Daniel P. Burke & Associates, PLLC

(57) ABSTRACT

Methods of the present invention are designed to offer insurance to lessees of vehicles to cover up front, out-of-pocket lease expenses in the event of a total loss, e.g., theft, and preferably include steps performed by a vehicle leasing dealer as well as steps performed by one or more participating insurers. The steps are preferably performed with the aid of computing devices which are in communication. When the lease is prepared, the relevant information about the lease and the lessee is submitted by the lease dealer to the participating insurers. The insurers determine the cost of supplemental insurance based on this information and, if the cost is acceptable, offer insurance coverage to the lessee.

24 Claims, 4 Drawing Sheets

OTHER PUBLICATIONS

Crane, Frederick G., Insurance Principles and Practices, 1980, pp. 383, 387, John Wiley & Sons.

Vaughan, Emmett J., Fundamentals of Risk and Insurance, 1978, p. 89, Second Edition, John Wiley & Sons.

Riegel, Robert, Insurance Principles and Practices, 1921, pp. i-xv, 1-27, Prentice-Hall, Inc.

Scallheim, James S. and McConnell, John J., A Model for the Determination of "Fair" Premiums on Lease Cancellation Insurance Policies, The Journal of Finance, Dec. 1980, pp. 1439-1457, vol. XL, No. 5.

* cited by examiner

SYSTEMS AND METHODS FOR PROVIDING SUPPLEMENTAL INSURANCE FOR LEASED VEHICLES

RELATED APPLICATION DATA

This application is a continuation-in-part of U.S. patent application Ser. No. 10/317,268 filed on Dec. 10, 2002, now U.S. Pat. No. 7,610,209 issued on Oct. 27, 2009.

The invention relates to systems, methods and apparatus for providing insurance coverage. More particularly, the invention relates to systems, methods and apparatus for providing supplemental insurance for leased vehicles.

BACKGROUND

One of the most commonly leased types of vehicles is the motor vehicle and, in particular, consumer motor vehicles. Leasing a motor vehicle can involve a significantly lower monthly payment as compared to financing the purchase of the same motor vehicle. Nevertheless, most automotive leases typically require significant cash payments at the time the lease is signed.

Insurance coverage for purchased vehicles may cover the value of the vehicles at the time of total loss or may cover the cost of replacement. Insurance coverage for leased items, typically covers the replacement value of the leased item to the owner and the lessee is relieved of further lease obligations. This can be insufficient for the lessee to replace a leased vehicle because of significant out of pocket expenses incurred when a lease is first signed.

SUMMARY OF THE INVENTION

Aspects of the present invention provide methods and apparatus for providing supplemental insurance for leased vehicles.

Other aspects of the present invention provide methods and apparatus for providing supplemental insurance for leased vehicles which reimburses at least one up front, out-of-pocket expense of the lease in the event of a total loss of the leased vehicle.

One preferred method of the present invention includes steps performed by an automotive leasing dealer as well as steps performed by one or more participating insurers. The steps are preferably performed with the aid of computers coupled to each other by a wide area network (WAN) or other connection. When the lease is prepared, the relevant information about the lease and the lessee is submitted by the lease dealer to the participating insurers. The insurers determine the cost of supplemental insurance based on this information and, if the cost is acceptable, offer insurance coverage to the lessee. If supplemental insurance is offered, the lease dealer presents the option(s) to the lessee. If the lessee chooses one of the insurance options, the lease is calculated with the cost of the supplemental insurance. The insurance premium is collected and the policy is issued with the lease. If no insurance offer is made or if the lessee declines the offer(s), the lease is prepared without the cost of supplemental insurance.

Another embodiment of the present invention is directed to a system for providing supplemental lease insurance to a lessee of a vehicle to cover at least one up front cost of a lease in the event of a total loss of the vehicle. The system comprises at least one computer processor, at least one storage medium and a user interface which is in communication with the computer processor. The user interface is used to receive relevant information of the lease which comprises at least one up front cost of the lease. The computer processor processes the relevant information received and is also in communication with an insurer's computer processor. The insurer's computer processor generates an insurance policy based on the relevant information and issues the insurance policy to the lessee. In the event of a total loss, the computer processor is also configured to process a claim and to process a payout for at least one of the up-front costs to the lessee. The payout can be for the full up-front costs or can be a pro-rated amount.

Yet another embodiment of the present invention is directed to a system for providing lease insurance to a lessee of a vehicle to cover at least one up front cost of a lease in the event of a total loss of the vehicle which comprises a user interface, a distributed network for transferring data from the user interface, and an insurance policy processing module which is remote form the user interface and coupled to the distributed network. The insurance policy processing module processes relevant information received by the user interface, identifies a total loss of the leased vehicle as the insurable event and determines a premium for issuing supplemental insurance to cover at least one up front cost of the lease. If the supplemental insurance is accepted then an insurer's computer generates an insurance document and issues the supplemental insurance to the lessee. The insurer's computer is also configured to process a claim in the event of a total loss, and to process a payout for at least one up front cost to the lessee.

Yet another embodiment of the present invention is directed to a method for providing supplemental insurance to a lessee of a vehicle to cover at least one up front cost of a lease in the event of a total loss of the vehicle comprising the steps of collecting relevant information regarding the vehicle lease, identifying a total loss of the leased vehicle as the insurable event, processing the relevant information and determining a cost of insuring based on at least some of the relevant information, and issuing supplemental insurance to cover at least one up front cost of the lease. In the event of a total loss of the leased vehicle, the method further comprising the step of processing a claim, determining a payout amount based on the at least one up front cost of the lease and making a payment to the lessee for the payout amount.

According to another embodiment of the present invention, the method disclosed above further comprises the step of providing a computer processing system comprising at least one computer processor, at least one storage medium and a user interface which is operatively connected to the computer processor for receiving the relevant information of the lease. The computer processing system is further used to process a claim in the event of a total loss of the leased vehicle and to determine a payout amount.

DETAILED DESCRIPTION

Figure 1:
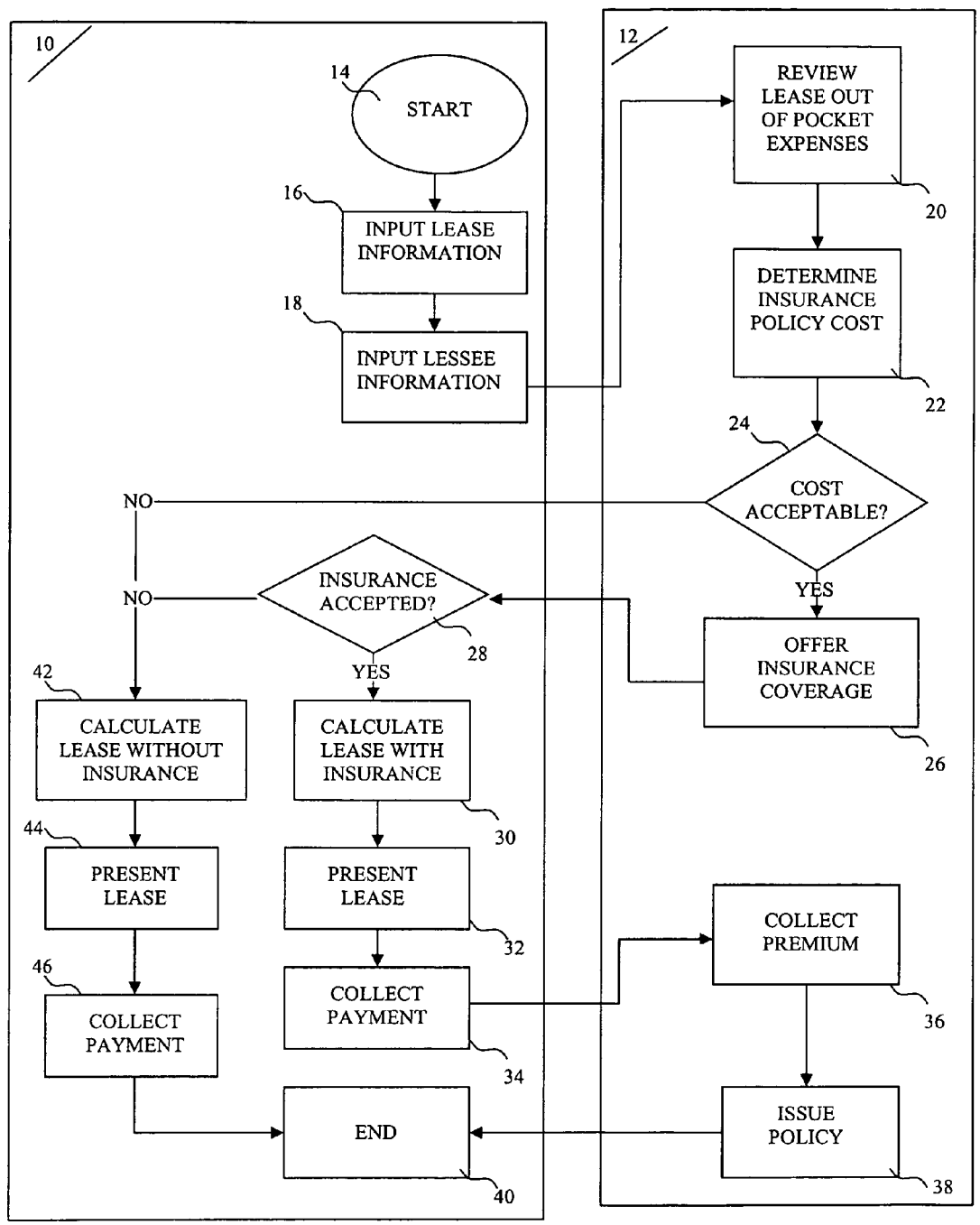
FIG. 1 is a schematic flow chart illustrating methods according to the invention.

Referring to FIG. 1, the method of one preferred embodiment of the present invention preferably include steps 10 performed by an automotive leasing dealer as well as steps 12 performed by one or more participating insurers. The method starts 14 when the lease is prepared. The relevant information about the lease is entered by the dealer 16 and the relevant information about the lessee is entered by the dealer 18. This information is supplied to at least one and preferably to more than one insurer so that multiple bids can be obtained.

The insurer(s) review the information 20 and determine the cost of supplemental insurance 22 based on this information. The insurer(s) decide whether the risk is acceptable 24. If the cost of the policy is determined to be acceptable 24, insurance coverage is offered 26.

If supplemental insurance is offered 26, the lease dealer presents the option(s) to the lessee 28. If the lessee chooses one of the insurance options, the lease is calculated with the cost of the supplemental insurance 30 and the lease is presented 32. The up front cost of the lease, including the cost of the supplemental insurance is preferably collected by the dealer 34. The dealer then forwards the insurance premium or guarantees the premium to the selected insurer as shown by the link from 34 to 36. Applicable regulations may require that the premium be forwarded directly to the insurance company or agent by the lessee in order to be binding on the insurance company.

The insurer collects the insurance premium or premium guarantee 36 and issues the policy 38. The process ends where the lessee is presented with the insurance policy 40.

If no insurance offer is made because the cost is determined to be unacceptable at 24 or if the lessee declines the offer(s) at 28, the lease is prepared 42 without the cost of supplemental insurance. The lease is presented to the lessee 44 and the up front cost of the lease is collected 46. The process ends 40.

From the present description, those skilled in the art will appreciate that the information obtained regarding the lease at 16 in FIG. 1 should likely include the type of vehicles being leased, the value of the vehicles, the length of the lease, the monthly lease payments, etc. The information obtained regarding the lessee 18 in FIG. 1 should likely include information which the insurer finds useful in determining the risk of total loss. For example, the age and gender of the lessee may well be relevant in determining the risk of loss. In the case of an automotive lease, the lessee's driving record may also be relevant.

Figure 2:
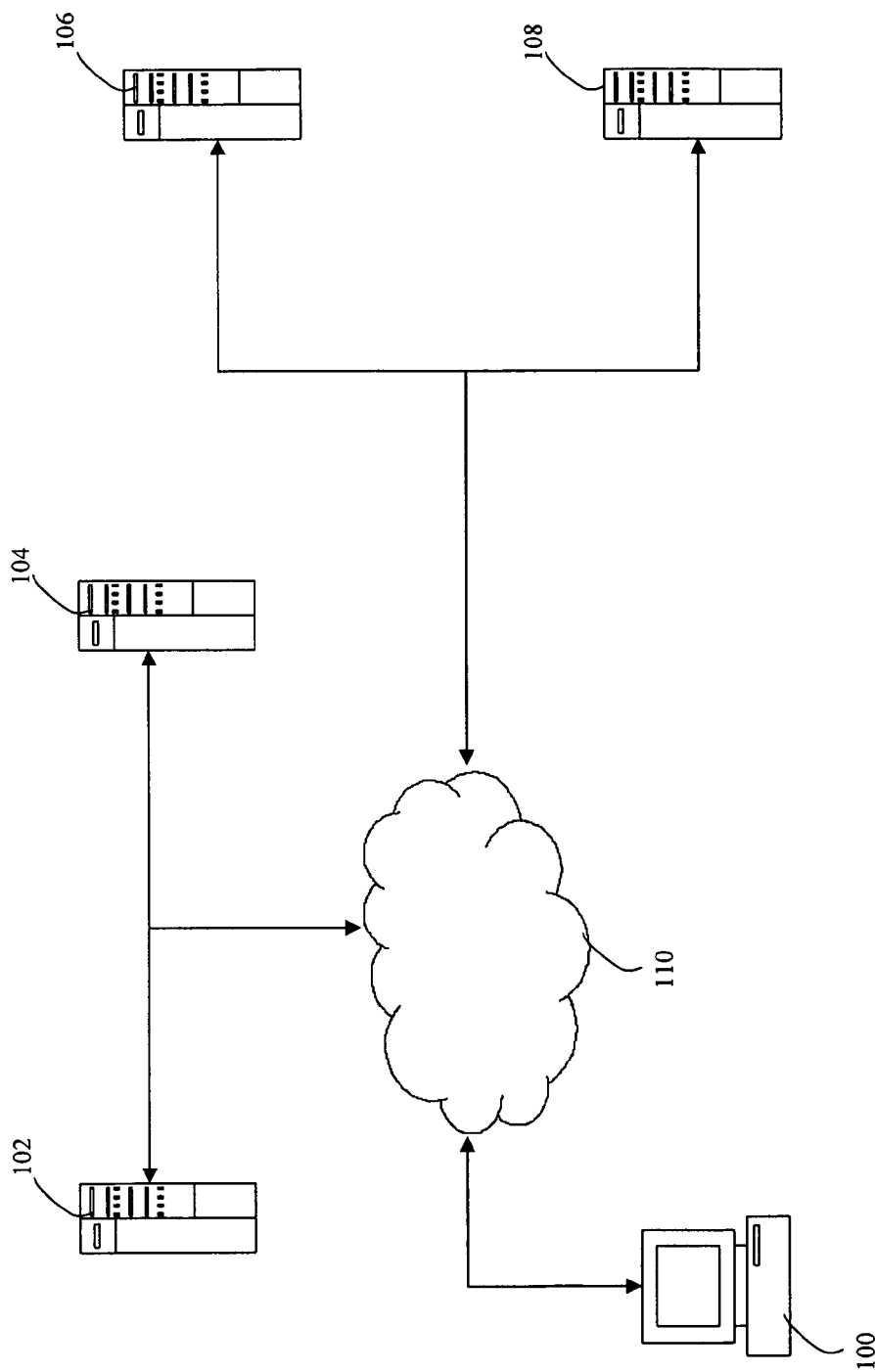
FIG. 2 is a schematic diagram of a computer network utilized to perform the methods of the invention.

As illustrated in FIG. 2, the methods of the invention are preferably implemented with a plurality of computing devices coupled to a wide area network. For example, a computer 100 located at a dealer is coupled to a plurality of computers 102, 104, 106, 108 located at different insurers via a network 110. The connection with the different computers is preferably virtually simultaneous so that requests for bids may be processed quickly. Alternatively, the dealer computer 100 may connect to a single sever computer which then communicates with the insurer computers. The insurer computers may be programmed to automatically respond to information submitted by a dealer. Alternatively, the insurer computers may be manually operated by underwriting personnel who make decisions in real time.

Although the preferred apparatus for performing the methods of the invention include separate dealer and insurer computers, the methods can be performed by a single dealer computer pre-programmed with insurer information. For example, one or more insurers may provide a dealer with risk analysis software which performs the insurer method steps on the dealer's computer. Still another apparatus for performing the methods of the invention include written instructions for determining whether to offer insurance and how much the premium should cost based on lease variables and readily determined data regarding the lessee. The written instructions may be provided by the insurer to the dealer for use by the dealer or may be used by underwriting personnel at the offices of the insurer in response to communication (e.g. telephone call) from the dealer.

The methods and apparatus of the present invention provide many advantages for lease dealers, insurers, and lessees. Lease dealers can offer a new service which gives them a competitive edge over other lease dealers. In addition, the lease dealers may be able to earn additional income by acting as agent for the insurer if insurance regulations permit. The insurer can increase income by offering an additional and desirable product. The lessee can obtain assurance that in the event of a total loss of the leased vehicles, it can be replaced with identical vehicles without repeating the expense of the up front costs of the lease. The up front costs which can be insured in the event of total loss of the leased vehicle include the lessees: (1) down payment (capitalized cost reduction); (2) tax on the down payment; (3) a single payment lease amount when the total lease expense is paid as a single up front payment; (4) tax on a single payment lease amount; (5) a security deposit; (6) bank fees; and (7) state sales tax.

One embodiment of the present invention is directed to a system for providing supplemental insurance for a leased vehicle wherein the system comprises at least one computer processor, at least one storage medium for storing data and a user interface operatively connected to the computer processor for receiving relevant information. The relevant information comprises at least information about the at least one up front cost of the lease. Relevant information preferably also includes information about the lease, information about the leased vehicle, and information about the lessee.

According to one embodiment of the present invention, this information is collected by the insurer or the dealer and inputted using the user interface. The inputted relevant information is then processed by the computer processor or an insurer's computer and used to determine a premium of insurance for issuing a policy to cover at least one up front cost of the lease if the leased vehicle is deemed a total loss. The premium is calculated by the computer processor or a insurer's computer using conventional methods for determining costs of motor vehicle insurance. The relevant information is used to classify the vehicle and/or the lessee into an actuarial class for which insurance rates are assigned based upon the experience of the insurer or based on current insurance rating systems. The actual percentage of vehicles which result in a total loss is known or readily available to the established insurance companies. According to another embodiment of the present invention, the premium for the supplemental insurance is determined solely by information regarding the vehicle being leased.

Another embodiment of the present invention is directed to a system comprising a user interface, a distributed network, and an insurance policy processing module. The user interface is used by a lease dealer or an insurer, such as an insurance broker, to input information regarding the lessee, the lease and/or leased vehicle, and the up front costs collected by the lease dealer. The inputted data is then transferred to an insurance policy processing module by a distributed network. The insurance policy processing module is remote from the user interface and coupled to the distributed network. The insurance policy processing module processes the relevant information received and determines a premium of insurance based on the relevant information and the risk associated with a total loss of the leased vehicle. If the lessee accepts the insurance, an insurer's computer then generates the insurance document and issues the supplemental insurance policy to the lessee after collecting a premium from the lessee. The supplemental insurance need not be a separate policy and according to another embodiment, the supplemental insurance can be issued as part of another insurance policy issued to the lessee. The supplemental insurance can also be issued as an amendment to an existing insurance policy. As used herein the term "document" is not limited to a paper document and refers to information stored in any medium including electronic form.

In the event of the insurable event, i.e., a total loss of the leased vehicle, the insurer's computer is also configured to process a payout for at least one of the up front costs paid by the lessee at the time of the lease inception. In processing the payout, the payout may include the full amount of at least one up front cost. Alternatively, the payout may be pro-rated. According to one embodiment, the payout is pro-rated over the time left on the lease. According to another embodiment, the payout is pro-rated based on the value of the vehicle at the time of the insurable event relative to a percentage of the original value of the leased vehicle at the time of lease inception.

In addition to the supplemental insurance optionally being offered by the lease dealer or an insurer at the time of the lease, the supplemental insurance can also be purchased by a lessee at a later date. For example, some time after the inception of the lease, a lessee can request supplemental insurance to cover the up front costs associated with the lease from an insurer or even the lease dealer. If this supplemental insurance is requested at a date after lease inception, the insurer or entity offering the supplemental insurance can optionally pro-rate the premium and/or the payout for the up front costs that were paid by the lessee at the time of lease inception.

Figure 3:
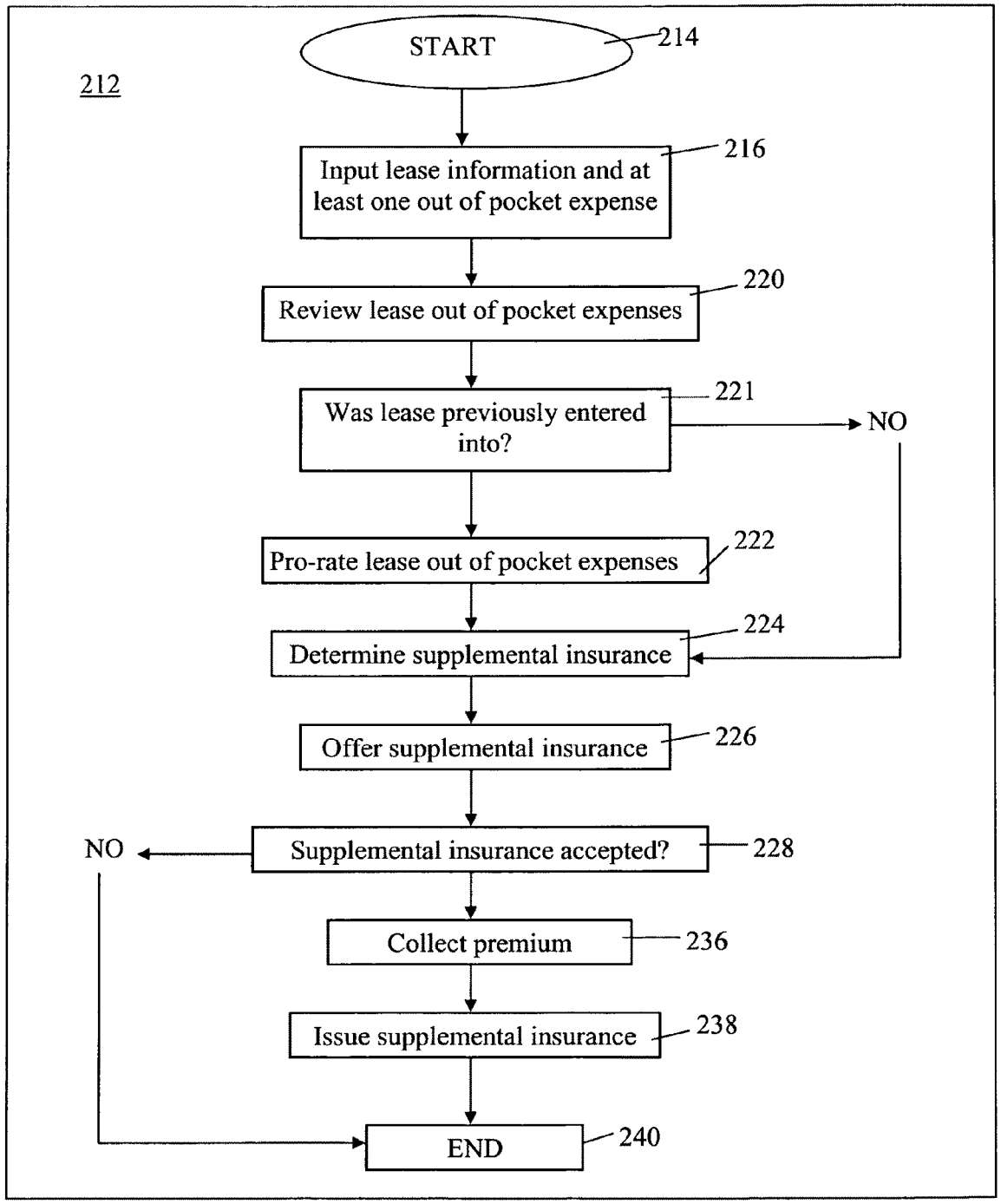
FIG. 3 is a schematic flow chart illustrating another method of the present invention.

Referring to FIG. 3, a method of one embodiment of the present invention include steps 212 performed by one or more participating insurers. The method starts 214 when the lessee requests supplemental insurance. The relevant information about the lease is entered by the insurer or insurance broker 216. This information is supplied to at least one and preferably to more than one insurer so that multiple bids can be obtained.

The insurer(s) review the information 220 and determine if the lease was previously entered into 221. If the lease was previously entered into the lease out-of-pocket expenses can be optionally pro-rated 222 and the insurer determines the cost of supplemental insurance 224 based on this information.

The supplemental insurance is then offered 226 and if the supplemental insurance is accepted 228 then the insurance premium is collected 236 and the supplemental insurance policy is issued 238. The process ends where the lessee is presented with the insurance policy 240.

Figure 4:
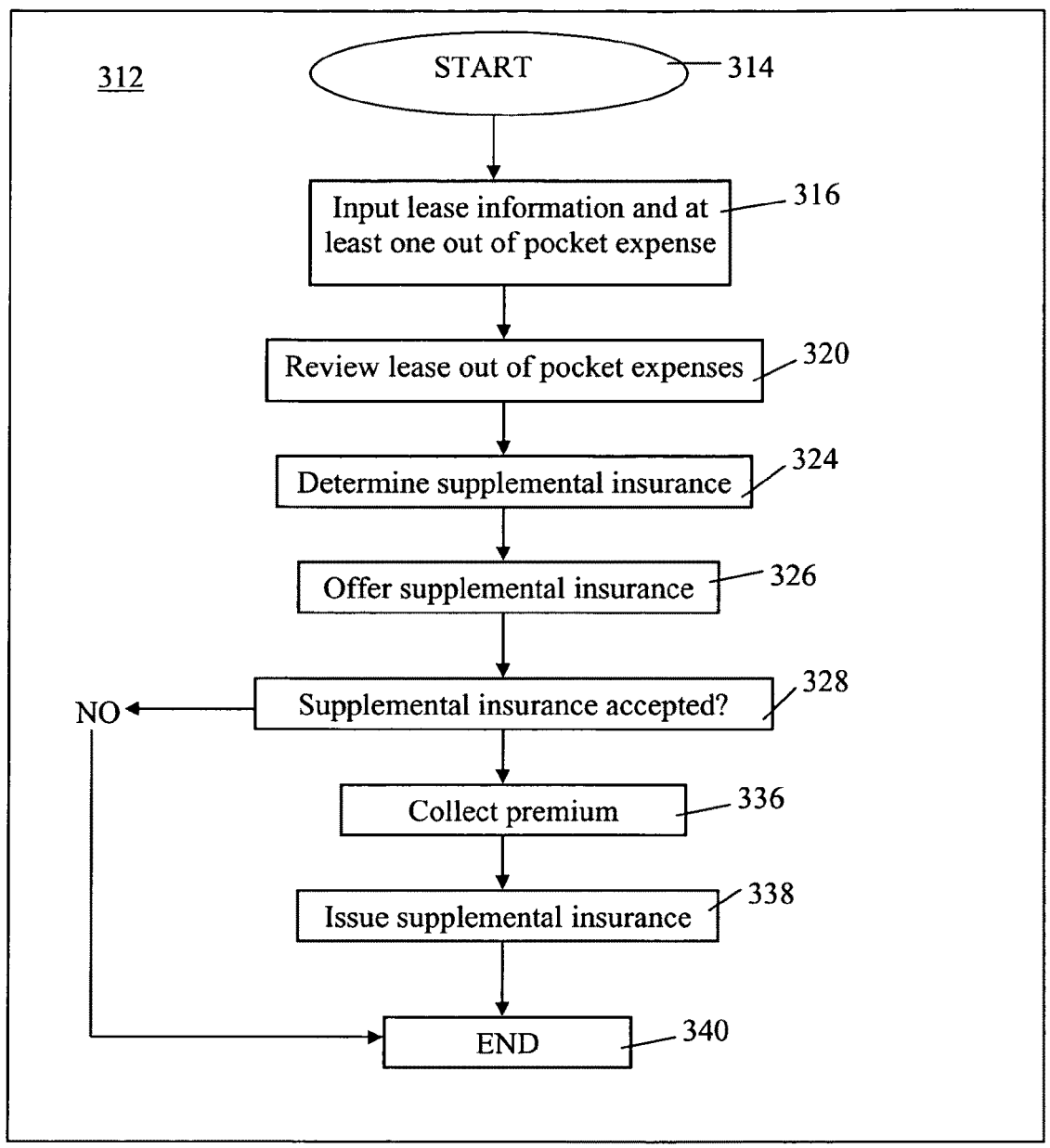
FIG. 4 is a schematic flow chart illustrating yet another method of the present invention.

Referring to FIG. 4, the method of another embodiment of the present invention does not involve pro-rating the lease out of pocket expenses. The method according to this embodiment includes the steps 312 performed by one or more participating insurers. The method starts 314 when the lessee requests supplemental insurance. The relevant information about the lease is entered by the insurer or insurance broker 316. This information is supplied to at least one and preferably to more than one insurer so that multiple bids can be obtained.

The insurer(s) review the information 320 and determine the cost of supplemental insurance 324 based on this information. The supplemental insurance is then offered 326 and if the supplemental insurance is accepted 328 then the insurance premium is collected 336 and the supplemental insurance policy is issued 338. The process ends where the lessee is presented with the insurance policy 340.

Another embodiment of the present invention is directed to a method for providing supplemental lease insurance to a lessee of a vehicle to cover at least one up front cost of a lease in the event of a total loss of the vehicle. The method comprises providing a computer processor system which comprises at least one computer processor, at least one storage medium and a user interface which is operatively connected to the computer processor. Relevant information comprising at least one up front cost of the vehicle lease is collected and received by the user interface. The insurable event is identified as a total loss of the leased vehicle and the relevant information is processed to determine the cost of providing the supplemental lease insurance. The supplemental insurance policy is then issued to cover at least one up front cost of the lease. In the event of a total loss of the leased vehicle, a claim is processed with the computer processing system. The computer processing system is also used to determine a payout amount based upon the at least one up front cost of the lease. A payment of the payout amount is then made to the lessee.

Another embodiment of the present invention is directed to collecting relevant information regarding the vehicle lease and lessee, identifying a total loss of the leased vehicle as the insurable event, processing the relevant information and determining a cost of insurance based on at least some of the relevant information and issuing supplemental insurance to cover at least one up front cost of the lease. In the event of the insurable event, i.e. a total loss of the leased vehicle, a claim is processed, a payout amount is determined based on the at least one up front cost of the lease and a payment is made to the lessee for the payout amount.

The invention claimed is:

1. A system for providing supplemental lease insurance to a lessee of a vehicle to cover at least one up front cost of a lease in the event of a total loss of said vehicle, said system comprising:
   at least one computer processor for processing data;
   at least one storage medium which stores data;
   a user interface in communication with said at least one computer processor for receiving relevant information of a lease, said relevant information comprising at least one up front cost of said lease;
   said at least one computer processor is in communication with an insurer's computer processor and is configured to process said relevant information;
   wherein said insurer's computer processor generates an insurance policy based upon said relevant information to cover at least one up front cost of said lease in the event of a total loss of the leased vehicle, and wherein said insurer's computer processor issues said insurance policy to said lessee; and
   said at least one computer processor configured to process a claim in the event of a total loss and to process a payout for said at least one up front cost to said lessee.

2. A system according to claim 1 wherein said at least one up front cost comprises a down payment.

3. A system according to claim 2 wherein said at least one up front cost comprises tax on said down payment.

4. A system according to claim 1 wherein said user interface is located at a location remote from said insurer's computer processor.

5. A system according to claim 4 wherein said remote location is at a lease dealer.

6. A system according to claim 4 wherein said remote location is at an insurance broker.

7. A system according to claim 1 wherein said computer processor is configured to determine a premium for issuing said policy to cover at least one up front cost of said lease in the event of a total loss of the leased vehicle.

8. A system according to claim 1 wherein said payout comprises all of said at least one up front cost paid by said lessee.

9. A system according to claim 1 wherein said payout is pro-rated.

10. A system according to claim 1 wherein said vehicle is an automobile.

11. A system according to claim 1 wherein said at least one up front cost comprises a single payment lease amount.

12. A system according to claim 1 wherein said at least one up front cost comprises tax on a single payment lease amount.

13. A system according to claim 1 wherein said at least one up front cost comprises a security deposit.

14. A system according to claim 1 wherein said at least one up front cost comprises at least one bank fee.

15. A system according to claim 1 wherein said at least one up front cost comprises state sales tax.

16. A system according to claim 1 wherein said at least one computer processor is in communication with a plurality of computer processors of a plurality of insurers.

17. A method for providing supplemental lease insurance to a lessee of a vehicle to cover at least one up front cost of a lease in the event of a total loss of said vehicle, said method comprising:
    collecting relevant information regarding the vehicle lease;
    identifying a total loss of said leased vehicle as an insurable event;
    processing, with a computer, said relevant information and determining a cost of insuring based upon at least said relevant information;
    issuing supplemental insurance to cover at least one up front cost of the lease;
    processing a claim in the event of said insurable event; and
    determining a payout amount based on said at least one up front cost of said lease;
    making a payment to said lessee for said payout amount.

18. A method according to claim 17 further comprising the step of providing a computer processing system comprising:
    at least one computer processor for processing data;
    at least one storage medium for storing data;
    a user interface operatively connected to said at least one computer processor for receiving relevant information of a lease, said relevant information comprising at least one up front cost of said vehicle lease.

19. A method according to claim 17 further comprising the step of collecting at least one up front cost for the vehicle lease.

20. A method according to claim 17 further comprising the step of collecting a premium for said supplemental lease insurance.

21. A method according to claim 17 wherein said user interface is located at a location remote from each of said at least one computer processor and said insurer's computer processor.

22. A method according to claim 17 wherein said remote location is at a lease dealer.

23. A method according to claim 17 wherein said remote location is at an insurance broker.

24. A system for providing supplemental lease insurance to a lessee of a vehicle to cover at least one up front cost of a lease in the event of a total loss of said vehicle, said system comprising:
    a user interface for receiving relevant information of said lease, said relevant information comprising at least one up front cost of said lease;
    a distributed network for transferring data from said user interface;
    an insurance policy processing module, remote from said user interface and coupled to said distributed network, that processes said relevant information, identifies a total loss of a leased vehicle as an insurable event, and determines a premium for issuing supplemental insurance to cover at least one up front cost of said lease in the event of a total loss;
    an insurer's computer generates an insurance document and issues said supplemental insurance to said lessee, and
    wherein said insurer's computer is configured to process a claim in the event of a total loss, and to process a payout for said at least one up front cost to said lessee.

* * * * *